Patented Mar. 2, 1943

2,312,715

UNITED STATES PATENT OFFICE 2,312,715

EMULSION FOR BURN TREATMENT

Robert L. Holmes, Roselle, and Hugh C. De Hoff, Roselle Park, N. J., assignors to Stanco, Incorporated No Drawing. Application October 4, 1939, Serial No. 297,810

11 Claims. (Cl. 167—58)

This invention relates to a new composition of matter, and particularly to a composition of matter containing tannic acid and polyisobutylene which is particularly adapted to the treatment of burns; and to the method of treating burns.

The medication and treatment of burns is one of the more difficult problems facing the medical profession, and many substances and mixtures have been proposed for the application as medicaments to burned surfaces on the human body. Among the most effective treatments now known is one involving the application to the burned surface of a moderately strong tannic acid solution in water. The use of this substance produces favorable results, but it is unsatisfactory because of the fact that it offers no protection against the air, and provides no foundation or cushion to protect the burned surfaces from contact with dressings.

The present invention provides a medicament consisting of a solution of tannic acid in combination with an emulsion of polyisobutylene together with other protective and curative substances. This composition of matter enables the tannic acid to exercise its desired function of hardening and stiffening the injured surface tissues, and at the same time the polyisobutylene provides a soft, flexible covering to the extremely delicate growing tissues at the surface, provides a protective covering to reduct the contact with the air, or to exclude air entirely, and to permit of the application of dressings to the burned surfaces for protection of the wound against dirt and large objects in the usual manner.

Thus an object of the invention is to combine a tannic acid solution and a polyisobutylene emulsion into a medicament suitable for promoting the healing of burned surfaces; another object is to apply to burned surfaces a solution of tannic acid and simultaneously therewith an emulsion of polyisobutylene, to harden the burned surfaces by the tannic acid and thereafter protect them by a covering of polyisobutylene derived from the emulsion; and another object is mildly to anaesthetize burned surfaces while tanning them with tannic acid and covering them with a layer of polyisobutylene with auxiliary filming agents of the type of tragacanth and glycerine. Other objects and details will be apparent from the following description.

The composition of the invention is prepared by incorporating together the substances of the following formula:

|  | Per cent |
| --- | --- |
| Tragacanth | 1–1.5 |
| Tannic acid | 1–5 |
| Polyisobutylene | 5–10 |
| White oil | 30–40 |
| Benzocaine | 1–2 |
| Glycerine | 5–10 |
| Water | 40–50 |

In compounding the formula, the benzocaine is dissolved in the glycerine and then the tragacanth, tannic acid, and the glycerine-benzocaine solution may be dissolved in the water; the white oil and the polyisobutylene may be worked up together to produce a solution of the polyisobutylene in white oil which is then emulsified in the water solution of the other substances.

The resulting composition is a creamy emulsion, which is readily applied to the burned surfaces by the use of a fine brush, or a pledget of cotton, or by pouring the creamy emulsion from the container directly onto the burned surface, in which case there is no chance for mechanical abrasion of the delicate surfaces. A single application may serve for the entire healing of the burn; or in more severe cases, or where inspection is necessary, the first application may be removed by a stream of water or a water-saturated pledget of cotton, or by non-aqueous solvents if necessary. It may be noted that the composition contains no alcohol or other irritant or pain-producing substance to cause discomfort to the patient. The tragacanth is film-forming and completely non-pain-producing. The tannic acid provides the desired hardening and toughening effect upon the surface tissues to protect the underlying growing tissues. The polyisobutylene provides the desired filming and adhesive effect to cause the tanned surface films or tissues to adhere to underlying tissues and to adjacent tissues while forming an impervious covering. It also prevents the formation of a hard coating by acting as a skin lubricant. The white oil increases the fluidity of the polyisobutylene and aids in the formation of the desired impervious film. The benzocaine performs the desired function of a powerful local anesthetic. The glycerine, by its hydroscopic and softening properties, prevents the development of an unduly stiff or harsh coating, and the water functions as a carrier to permit of the application of the composition to the injured tissues. The water largely evaporates in a relatively short time.

In the preparation of this composition the polyisobutylene portion is desirably the type having a relatively low molecular weight ranging from 3500 to about 10,000, and the preferred molecular weight is about 7,000. Alternatively, much higher or lower molecular weight polyisobutylene may be used for special applications, particularly in combination with varying amounts of oil and other substances. The preferred embodiment utilizes tannic acid as the tanning agent. Alternatively, other tanning agents such as picric acid or alum may be used. Alternatively also, sodium bicarbonate or other alkaline substance such as calcium hydroxide suspension may be used in place of the tannic acid. Alternatively also, the benzocaine may be omitted, or may be replaced by other analogous substances such as menthol, or novocaine, or other anesthetic.

The particular features of advantage from the present composition are found in the combined and interrelated actions of the tanning effect of the tannic acid and the adhesive and lubricating effects of the polyisobutylene, which produces the new, useful and unexpected effect of causing the tanned tissues to form a much more firm protective layer, and greatly facilitate the growth of new tissues and new skin beneath the tanned protective layer as reinforced by the adhesive layer of polyisobutylene and oil and protected by the air-impervious layer of hydrocarbon material.

Thus the composition of matter of the invention provides a new combination of medicaments in which the effect of a tanning agent is reinforced, modified and strengthened by the presence of a non-irritating, adhesive film which simultaneously excludes air, reinforces the protective layer, and cushions the wounded tissues against the application of a suitable dressing.

While there are above disclosed but a limited number of embodiments of this invention, it is possible to produce still other embodiments without departing from the inventive concepts herein disclosed, and it is therefore desired that only such limitations be imposed on the appended claims as are stated therein or required by the prior art.

The invention claimed is:

1. A burn remedy comprising in combination an emulsion of polyisobutylene and a solution of a tanning agent.

2. A burn remedy comprising in combination an emulsion of polyisobutylene and a solution of a tanning agent comprising tannic acid.

3. A burn remedy comprising in combination an emulsion of polyisobutylene and a solution of a tanning agent comprising picric acid.

4. A burn remedy comprising in combination an emulsion of polyisobutylene and a solution of a tanning agent comprising sodium bicarbonate.

5. A burn remedy comprising an emulsion of polyisobutylene and oil in a solution of a tanning agent.

6. A burn remedy comprising an emulsion of polyisobutylene and oil in a solution of a tanning agent comprising tannic acid.

7. A burn remedy comprising an emulsion of polyisobutylene and oil in a solution of a tanning agent comprising tannic acid and tragacanth as an emulsifying agent.

8. A burn remedy comprising an emulsion of polyisobutylene and oil in a solution of a tanning agent comprising tannic acid, tragacanth as an emulsifying agent and glycerine as a hydroscopic and softening agent.

9. A burn remedy comprising an emulsion of polyisobutylene and oil in a solution of a tanning agent comprising tannic acid, tragacanth as an emulsifying agent, glycerine as a hydroscopic and softening agent and a mild anesthetic.

10. A burn remedy comprising an emulsion of polyisobutylene and oil in a solution of a tanning agent comprising tannic acid, tragacanth as an emulsifying agent, glycerine as a hydroscopic and softening agent and a mild anesthetic comprising menthol.

11. A burn remedy comprising an emulsion of polyisobutylene and oil in a solution of a tanning agent comprising tannic acid, tragacanth as an emulsifying agent, glycerine as a hydroscopic and softening agent and an anesthetic comprising benzocaine.

ROBERT L. HOLMES.
HUGH C. DE HOFF.